United States Patent [19]

Ichino

[11] Patent Number: 5,761,556
[45] Date of Patent: Jun. 2, 1998

[54] OPTICAL APPARATUS

[75] Inventor: Kazushige Ichino, Tokyo, Japan

[73] Assignee: Canon Kabushi Kaisha, Tokyo, Japan

[21] Appl. No.: 838,464

[22] Filed: Apr. 7, 1997

Related U.S. Application Data

[63] Continuation of Ser. No. 345,571, Nov. 28, 1994, abandoned.

[30] Foreign Application Priority Data

Dec. 1, 1993 [JP] Japan ................ 5-301730

[51] Int. Cl.[6] .................. G03B 5/02; G03B 17/04
[52] U.S. Cl. ............................. 396/349; 396/448
[58] Field of Search ...................... 354/187, 288, 354/195.1, 195.2; 359/611, 511; 396/448, 348, 349

[56] References Cited

U.S. PATENT DOCUMENTS

| Re. 34,453 | 11/1993 | Kamitani et al. | 354/195.1 |
|---|---|---|---|
| 4,847,648 | 7/1989 | Yamaguchi et al. | 354/195.1 |
| 5,144,493 | 9/1992 | Nomura | 359/700 |
| 5,434,714 | 7/1995 | Kohmoto et al. | 359/740 |
| 5,440,431 | 8/1995 | Jeong | 359/704 |
| 5,475,456 | 12/1995 | Haraguchi et al. | 354/187 |
| 5,486,889 | 1/1996 | Shintani | 354/202 |
| 5,489,958 | 2/1996 | Katagiri et al. | 354/195.12 |
| 5,510,868 | 4/1996 | Nomura et al. | 354/208 |
| 5,515,135 | 5/1996 | Katayama et al. | 354/485 |

*Primary Examiner*—Safet Metjahic
*Assistant Examiner*—Christopher E. Mahoney
*Attorney, Agent, or Firm*—Robin, Blecker, Daley and Driscoll

[57] ABSTRACT

An optical apparatus having a movable lens barrier and a lens movable in the direction of an optical axis is provided with a barrier moving mechanism for moving the lens barrier in the direction of opening or closing. The barrier moving mechanism includes a moving member which is arranged to move in the direction of the optical axis and also around the optical axis in association with a movement of the lens. The lens barrier is arranged to be move in the direction of opening or closing by a movement of the moving member based on the movement of the lens to a specific position.

31 Claims, 8 Drawing Sheets

FIG. 2(a)
BARREL-RETRACTED

FIG. 2(b)
WIDE-ANGLE

FIG. 2(c)
TELEPHOTO

FIG.3(c) TELEPHOTO

FIG.3(b) WIDE-ANGLE

FIG.3(a) BARREL-RETRACTED

FIG.4(b) WIDE-ANGLE

FIG.4(a) TELEPHOTO

FIG.5(a) TELEPHOTO

FIG.5(b) WIDE-ANGLE

FIG.6(c) PRIOR ART TELEPHOTO

FIG.6(b) PRIOR ART WIDE-ANGLE

FIG.6(a) PRIOR ART BARREL-RETRACTED

FIG. 7(a)
PRIOR ART
BARREL-RETRACTED

FIG. 7(b)
PRIOR ART
WIDE-ANGLE

FIG. 7(c)
PRIOR ART
TELEPHOTO

OPTICAL APPARATUS

This is a continuation application under 37 CFR 1.62 of prior application Ser. No. 08/345,571, filed Nov. 28/1994, now abandoned.

BACKGROUND OF THE INVENTION

1. Field of the Invention

This invention relates to an optical apparatus having a lens barrier.

2. Description of the Related Art

Figure 6A:
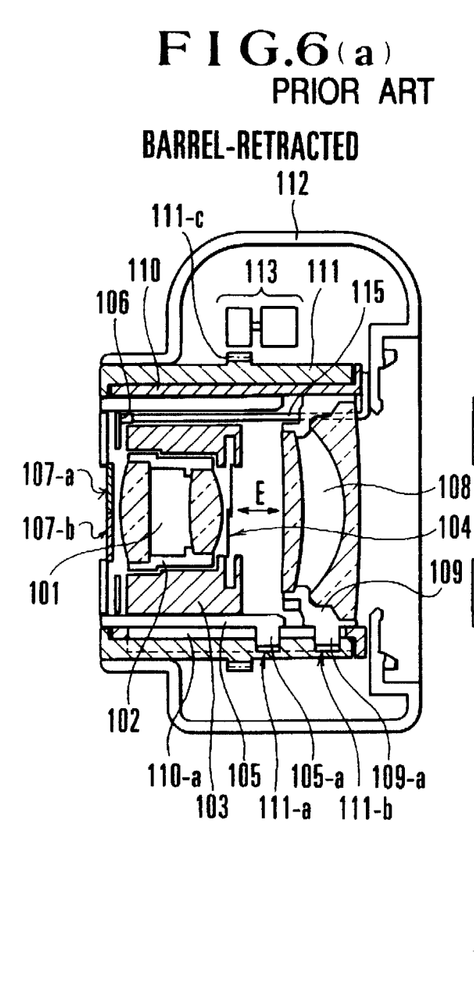
FIGS. 6(a), 6(b) and 6(c) are center sectional views showing the arrangement of the conventional lens barrier opening/closing mechanism.
Figure 6B:
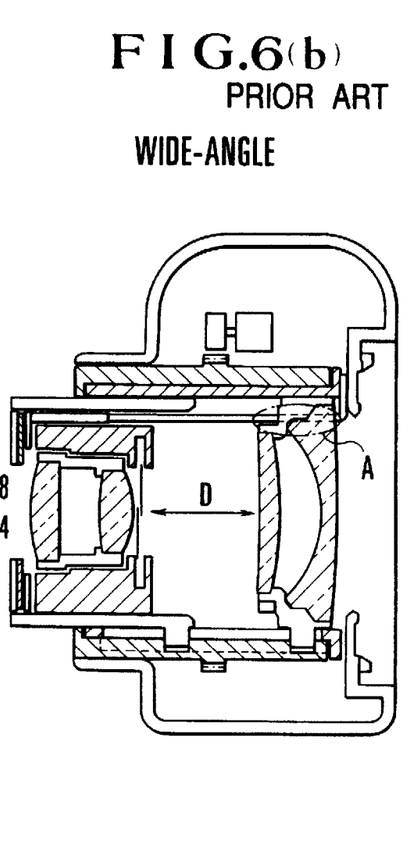
Figure 6C:
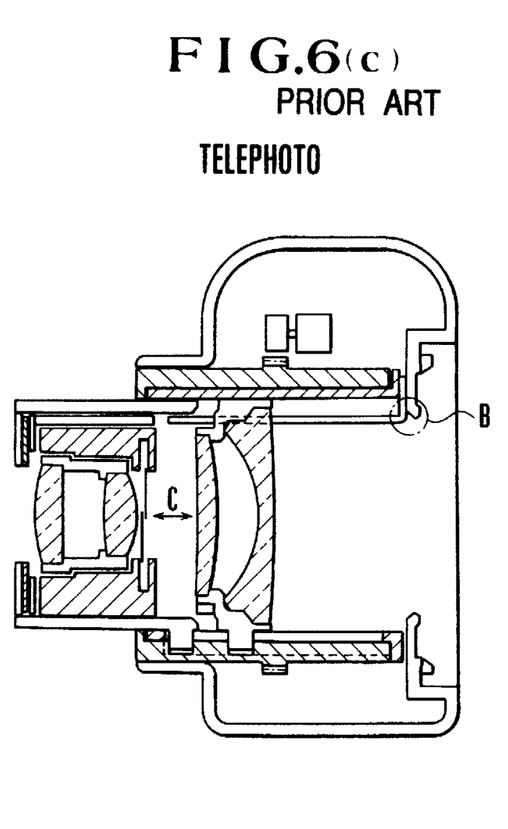
Figure 7A:
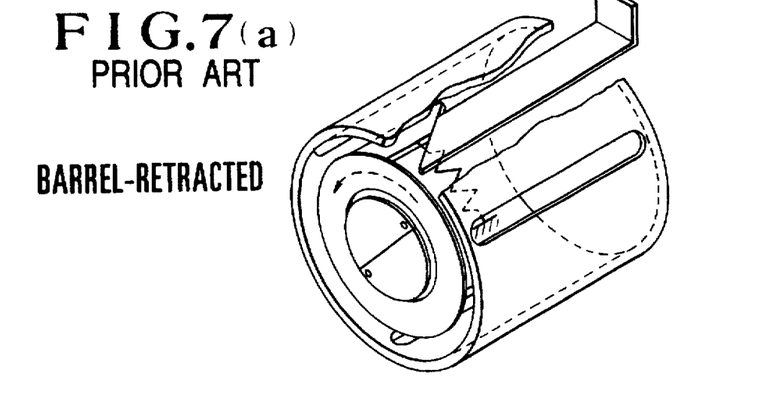
FIGS. 7(a), 7(b) and 7(c) are oblique views of the conventional lens barrier opening/closing mechanism.
Figure 7B:
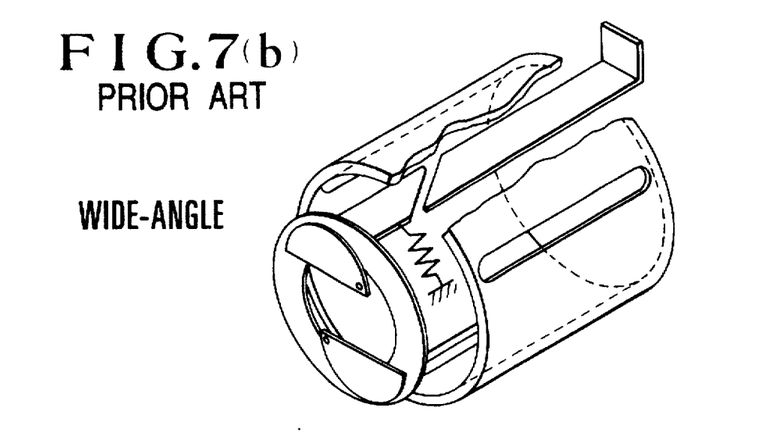
Figure 7C:
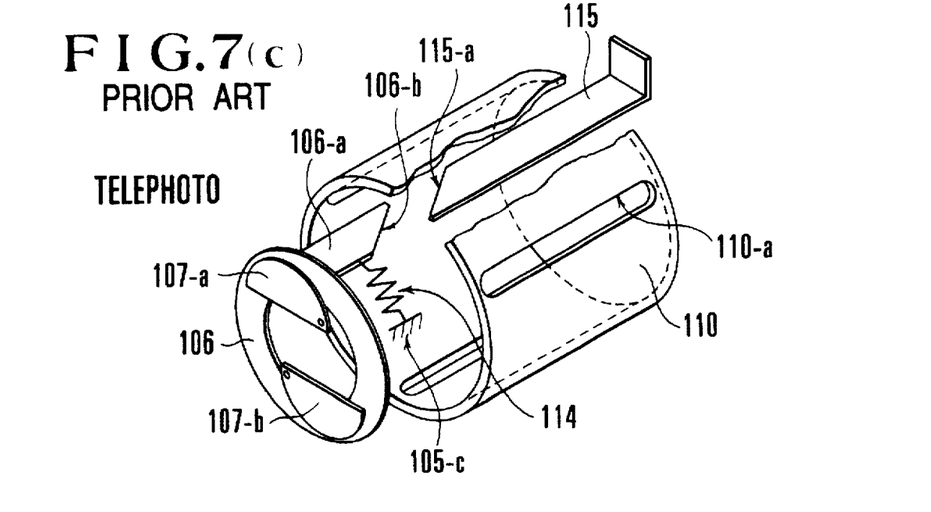
Figure 8A:
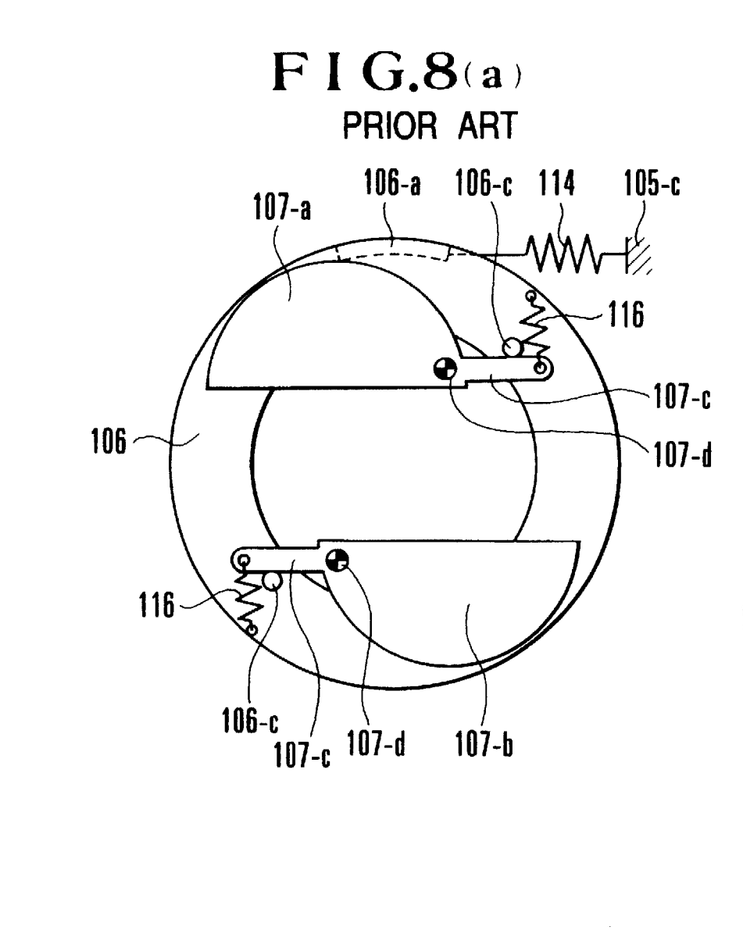
FIGS. 8(a) and 8(b) are front views of the opening/closing mechanism of the lens barrier.
Figure 8B:
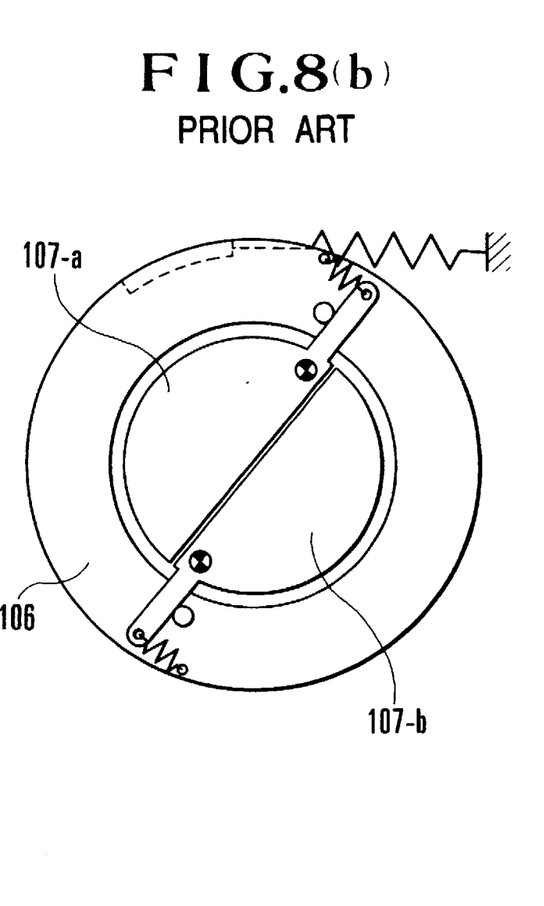

FIGS. 6(a) to 6(c), 7(a) to 7(c), 8(a) and 8(b) show by way of example the arrangement of a conventional lens barrier opening/closing driving mechanism. Of these figures, FIGS. 6(a) to 6(c) are center sectional views showing the structural arrangement of the mechanism. FIGS. 7(a) to 7(c) are oblique views showing the essential parts of the mechanism. FIGS. 8(a) and 8(b) are front views of an opening/closing mechanism of the lens barrier itself. In the case of FIGS. 6(a) to 6(c), the barrier opening/closing driving mechanism is applied to a zoom camera, which is arranged to shift the position of a two-group zoom lens of a positive-and-negative arrangement type to and from a barrel-retracted state shown in FIG. 6(a), a wide-angle state shown in FIG. 6(b) or a telephoto state shown in FIG. 6(c).

The opening and closing actions of the lens barrier are first described with reference to FIGS. 8(a) and 8(b). The lens barrier is operated fundamentally as follows: When a turning force is applied to a barrier opening/closing ring 106 to cause it to rotate around an optical axis, barrier members 107-a and 107-b concurrently perform an opening or closing action. The barrier opening/closing ring 106 is urged to rotate to the right by a tension spring 114. The barrier members 107-a and 107-b are rotatably mounted on a base plate (not shown) through rotation shafts 107-d.

The barrier members 107-a and 107-b are provided with arm parts 107-c. A tension spring 116 is hooked to the fore end of each of the arm parts 107-c and to the barrier opening/closing ring 106. The barrier members 107-a and 107-b are thus urged to swing to the left by the tension springs 116. The barrier opening/closing ring 106 is provided with stoppers 106, which are arranged to abut respectively on the arm parts 107-c.

With the lens barrier arranged in this manner, the barrier members 107-a and 107-b close the lens barrier as the barrier opening/closing ring 106 rotates to the left as shown in FIG. 8(a), and open the lens barrier as the barrier opening/closing ring 106 rotates to the right as shown in FIG. 8(a). However, the lens barrier as a whole is urged to move in the direction of opening by the tension spring 114. Even in a case where an external force is exerted to forcibly open the barrier members 107-a and 107-b by some obstacle or the like, the external force merely disengages the arm parts 107-c from the stoppers 106-c, while the barrier opening/closing ring 106 itself is never caused to rotate.

FIGS. 6(a) to 6(c) are center sectional views showing a zoom lens barrel having the above-stated barrier opening/closing mechanism. Referring to these figures, a first lens group 101 is carried by a first lens frame 102. A drawing-out mechanism for drawing out the first lens group 101 for focusing and a shutter opening/closing mechanism 103 for opening and closing shutter blades 104 are carried and held within a lens barrel 105. In front of the first lens group 101, the barrier opening/closing ring 106 is rotatably arranged within the lens barrel 105. The barrier opening/closing driving mechanism which is arranged to rotate the barrier opening/closing ring 106 will be described later herein.

The lens barrel 105 and a second lens frame 109 which carries a second lens group 108 are respectively provided with a plurality of cam pins 105-a and 109-a. A linear-motion tube 110 is secured to a camera body 112 and is arranged to guide the lens barrel 105 and the second lens frame 109 in the direction of an optical axis without rotating them. For this purpose, the linear-motion tube 110 is provided with slots 110-a in which the cam pins 105-a and 109-a are slidably fitted. A cam tube 111 which is fitted on the periphery of the linear-motion tube 110 has cam grooves 111-a and 111-b formed therein to satisfy the optical movement loci of the first and second lens groups 101 and 108. A gear part 111-c is provided on the outer circumferential side of the cam tube 111. The gear part 111-c includes a predetermined reduction mechanism and allows the cam tube 111 to be rotated by a motor 113 which is secured to the camera body 112.

The rotation of the cam tube 111 causes the lens barrel 105 and the second lens frame 109 to shift the first lens group 101 and the second lens group 108 from a telephoto state shown in FIG. 6(c) to a wide-angle state shown in FIG. 6(b). Further rotation of the cam tube 111 eventually brings about a barrel-retracted state shown in FIG. 6(a) through cam grooves 111-a and 111-b which are formed also in the cam tube 111 for the purpose of giving a barrel retracting locus. The further rotation of the cam tube 111 thus causes the whole zoom lens barrel to have a shorter length in the barrel-retracted state than in the telephoto and wide-angle states.

The barrier opening/closing driving mechanism which is provided for rotating the barrier opening/closing ring 106 is next described with reference to FIGS. 7(a) to 7(c). In FIGS. 7(a) to 7(c), all parts that would complicate the illustrations are omitted.

The barrier opening/closing ring 106 has an arm part 106-a which is provided with a cam face 106-b. The arm part 106-a extends in the direction of the optical axis. The tension spring 114 is hooked between the arm part 106-a and a predetermined part 105-c of the lens barrel 105 to urge the barrier opening/closing ring 106 to rotate to the right, as viewed on the drawing. Further, the barrier opening/closing mechanism 106 and the tension spring 114 are arranged to move together with the lens barrel 105 when the zoom lens barrel is operated to shift to or from the telephoto state, the wide-angle state or the barrel-retracted state. The barrier members 107-a and 107-b are driven to open the lens barrier by the rightward rotation of the barrier opening/closing ring 106 and to close the lens barrier by the leftward rotation of the barrier opening/closing ring 106, as described above with reference to FIGS. 8(a) and 8(b).

A fixed cam plate 115 is secured to the camera body 112 in a position which is in the rear of the arm part 106-a of the barrier opening/closing ring 106 in the direction of the optical axis. A cam face 115-a is formed at the fore end of the fixed cam plate 115. The cam face 115-a of the fixed cam plate 115 and the cam face 106-b which is formed at the fore end of the arm part 106-a are arranged to be not engaging each other when the zoom lens barrel is in the telephoto and wide-angle states as shown in FIGS. 7(c) and 7(b). The cam faces 115-a and 106-b are arranged such that they engage each other, as shown in FIG. 7(a), to cause the barrier opening/closing ring 106 to rotate to the left as indicated by a broken line arrow when the state of the zoom lens barrel is in process of shifting from the wide-angle state to the barrel-retracted state.

According to the arrangement described above, the barrier opening/closing ring 106 is urged by the tension spring 114 to rotate to the right while the lens barrel 105 is somewhat protruding in the telephoto state shown in FIG. 7(c) and also in the wide-angle state shown in FIG. 7(b). The barrier members 107-a and 107-b thus can be kept open under that condition. In shifting the zoom lens barrel from the wide-angle state (FIG. 7(b)) to the barrel-retracted state (FIG. 7(a)), the cam face 106-b of the barrier opening/closing ring 106 and the cam face 115-a of the fixed cam plate 115 engage each other to allow the barrier opening/closing ring 106 to rotate to the left against the urging force of the tension spring 114, so that the lens barrier members 107-a and 107-b can be closed at the same time.

Another example of the conventional barrier opening/closing driving mechanisms has been disclosed in Japanese Laid-Open Patent Application No. SHO 63-95426. In the case of this mechanism, the lens barrier is opened and closed by utilizing changes of a distance between two frames caused by their movements relative to each other in the direction of an optical axis. More specifically, the total relatively movable extent of the two frames which are arranged to be movable relative to each other is divided into two parts at a predetermined middle point. One part is arranged to be a focal length varying range. The other part is arranged to be a lens barrier opening/closing range. A lens barrier opening/closing action is thus arranged to be independent of a focal length varying action.

The above-stated two examples of the conventional mechanisms can be considered to be the same in respect of the arrangement to open and close the lens barrel by means of the barrier opening/closing ring. They, however, differ from each other in respect of a driving mechanism to be used for rotating the barrier opening/closing ring.

In the case of the prior art represented by FIGS. 6(a) to 6(c), the cam plate 115 is indispensable for causing the barrier opening/closing ring 106 to rotate. However, the position where the cam plate 115 is held is in the neighborhood of an aperture provided in the camera body 112. Therefore, in a case where the lens group 108 which has a large diameter and is disposed on the side of a film surface as indicated by a reference symbol A in FIG. 6(b), it is necessary to prevent the cam plate 115 from interfering with the lens group 108 either by cutting out part of the lens group 108 or by increasing the diameter of the whole zoom lens barrel. Further, even in a case where the zoom lens barrel can be arranged to have a small diameter, the cam plate 115 comes into the inside of the aperture, as indicated by a reference symbol B in FIG. 6(c). Then, to avoid this, the zoom lens barrel must be increased to have a larger diameter.

The other example of prior art is arranged to obtain a barrier opening/closing ring rotating force from changes taking place in the spacing distance between the two frames. However, a distance obtained between the frames in the barrel-retracted state can not be included in the range of distances obtained in a photo-taking state. In other words, in the case of a two-group zoom lens of a positive/negative arrangement type which is arranged, as shown in FIGS. 6(a) to 6(c), to have the distance between lenses become a maximum distance D in the wide-angle state of FIG. 6(b), a minimum distance C of FIG. 6(c) in the telephoto state and a short distance E of FIG. 6(a) which is similar to the distance C in the barrel-retracted state, if the lens barrier is to be opened and closed by utilizing the force of contracting the distance D to the distance E with the second lens frame 109 provided with a cam part similar to the cam plate 115, the lens barrier tends to be closed by the force of contracting the distance D to the distance C even while the zoom lens barrel is in the telephoto state in which the distance is close to the distance obtained in the barrel-retracted state.

SUMMARY OF THE INVENTION

One aspect of the invention lies in providing a camera having a lens barrier and a cam member arranged to act in association with the movement of the lens barrier in the direction of an optical axis to cause the lens barrier to close or open only in a specific position. The camera thus can be simply arranged to close or open the lens barrier only in a specific state.

The above and other aspects and features of the invention will become apparent from the following detailed description of embodiments thereof given with reference to the drawings forming a part of this application.

DETAILED DESCRIPTION OF THE PREFERRED EMBODIMENT

Figure 1A:
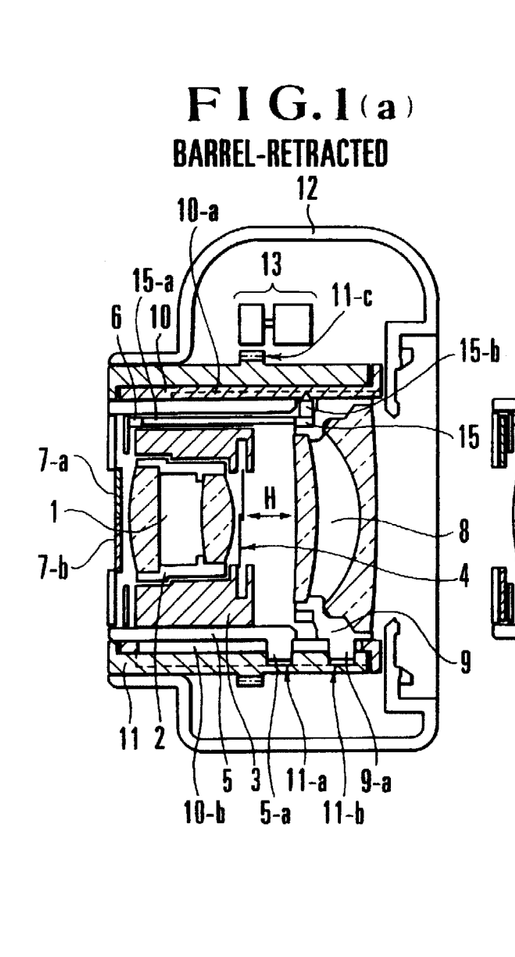
FIG. 1 is a center sectional view showing the arrangement of a first embodiment of the invention.
Figure 1B:
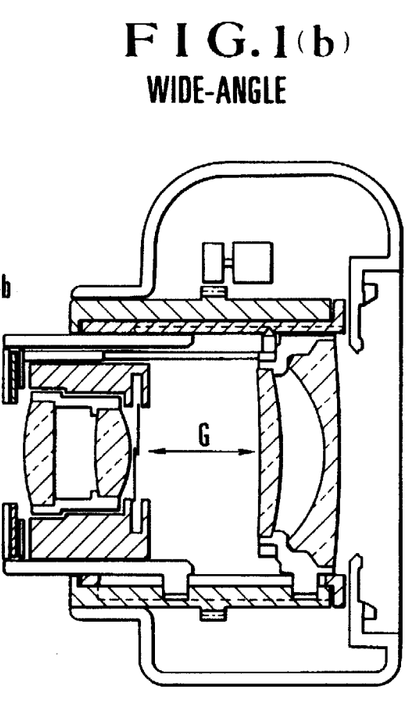
Figure 1C:
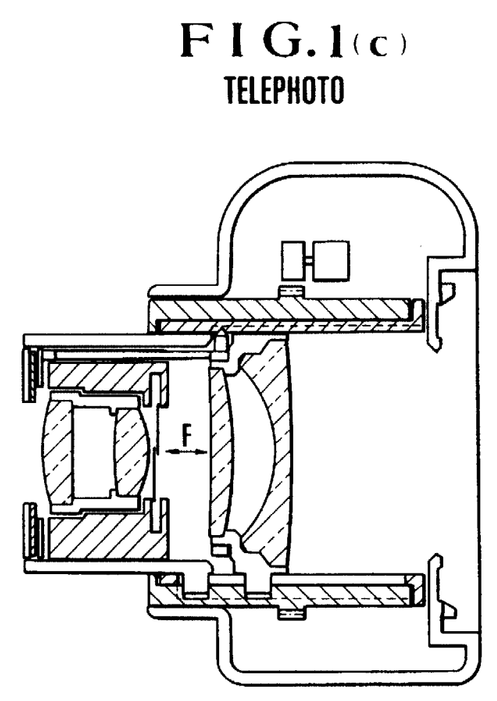
Figure 2A:
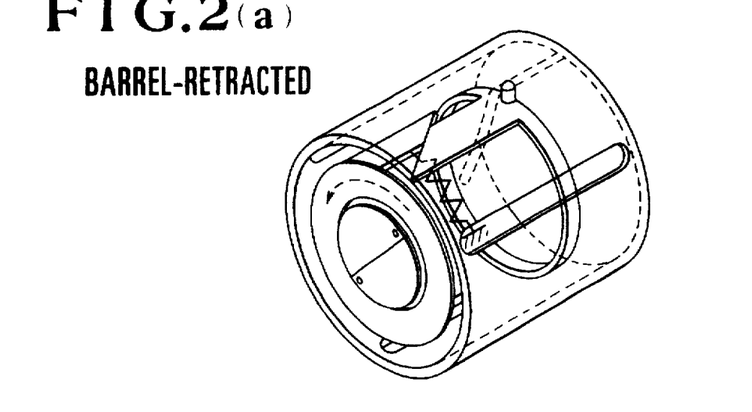
FIGS. 2(a), 2(b) and 2(c) are oblique views showing the essential parts of the first embodiment.
Figure 2B:
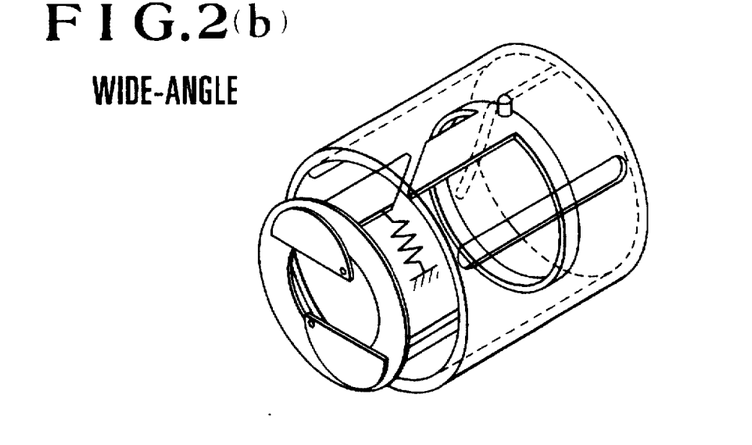
Figure 2C:
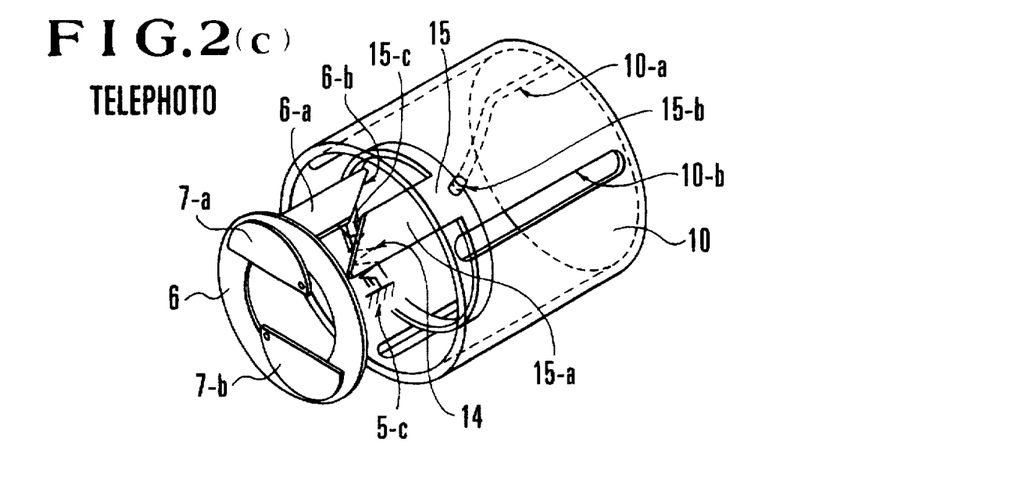

A first embodiment of the invention is arranged as described below with reference to FIGS. 1(a) to 1(c) and 2(a) to 2(c). FIGS. 1(a) to 1(c) are center sectional views showing the structural arrangement of the first embodiment. FIGS. 2(a) to 2(c) are oblique view showing the first embodiment, which is a two-group zoom lens of a positive-and-negative arrangement type like in the case of the prior art example described in the foregoing.

Referring to these figures, a first lens group 1 is carried by a first lens frame 2. A mechanism arranged to draw out the first lens group 1 for focusing and a mechanism 3 arranged to open and close shutter blades 4 are carried by and disposed within a lens barrel 5. A barrier opening/closing ring 6 is disposed in front of the mechanisms and is arranged to be rotatable within the lens barrel 5 to open and close barrier members 7-a and 7-b by receiving a force of rotation on the optical axis from a known driving mechanism. The opening/closing driving mechanism for rotating the barrier opening/closing ring 6 is an essential part with respect to the invention and, therefore, will be described in detail later herein.

The lens barrel 5 and a second lens frame 9 which carries a second lens group 8 are respectively provided with a plurality of cam pins 5-a and 9-a. A linear-motion tube 10 which is secured to a camera body 12 is provided with slots 10-b for slidably and fittingly engaging the cam pins 5-a and 9-a and for allowing the lens barrel 5 and the second lens frame 9 to be guided in the direction of the optical axis without making any turn. A cam tube 11 is fitted on the periphery of the linear-motion tube 10. The cam tube 11 is provided with cam grooves 11-a and 11-b which are formed to satisfy the optical motion loci of the first and second lens groups 1 and 8. A gear part 11-c is formed and arranged on the peripheral side of the cam tube 11 to have a predetermined reducing function and to have the cam tube 11 rotated by a motor 13 which is secured to the camera body 12.

The rotation of the cam tube 11 causes the lens barrel 5 and the second lens frame 9 to move the lens groups 1 and 8 to be shifted from a telephoto state shown in FIG. 1(c) to a wide-angle state shown in FIG. 1(b). The cam grooves 11-a and 11-b are formed in the cam tube 11 in such a way as to bring about a barrel-retracted state as shown in FIG. 1(a) at the end of the rotation of the cam tube 11. In the barrel-retracted state, the lens distance at which the lenses are spaced is made shortest, while the total thickness or length of the zoom lens is made shortest when the zoom lens barrel is in the telephoto state. Therefore, the whole zoom lens barrel can be shortened by shifting it to the barrel-retracted state.

The arrangement of a rotating mechanism for the barrier opening/closing ring 6 is next described with reference to FIGS. 2(a) to 2(c).

The barrier opening/closing ring 6 has an arm part 6-a. The arm part 6-a has a cam face 6-b and extends in the direction of the optical axis. A tension spring 14 is hooked between the arm part 6-a and a predetermined part 5-c of the lens barrel 5 to urge the barrier opening/closing ring 6 to rotate to the right as viewed on the drawing. Further, when the action of shifting the zoom lens barrel to or from the above-stated telephoto state, the wide-angle state or the barrier-retracted state is performed, the barrier opening/closing ring 6 and the tension spring 14 move along with the lens barrel 5 according to the lens shifting action. The barrier members 7-a and 7-b are driven to open the lens barrier when the barrier opening/closing ring 6 rotates to the right and to close the lens when the barrier opening/closing ring 6 rotates to the left, in the same manner as in the case of the conventional barrier opening/closing mechanism described in the foregoing.

The second lens frame 9 is provided with a ring-shaped rotary cam plate 15 which is arranged to move together with the second lens frame 9 which moves when the zoom lens barrel shifts to or from the telephoto state, the wide-angle state or the barrel-retracted state. The rotary cam plate 15 has an arm part 15-a which extends in the direction of the optical axis and is provided with a cam face 15-c. Further, a pin 15-b is planted on the side face of the ring part of the rotary cam plate 15. The pin 15-b engages a cam groove 10-a which is formed in the inner wall of the linear-motion tube 10. Therefore, as the second lens frame 9 moves in the direction of the optical axis, the rotary cam plate 15 moves accordingly while rotating on the optical axis along a locus defined by the cam groove 10-a. The cam groove 10-a is formed to define the locus on the following conditions:

(i) The rotary cam plate 15 is turned to the right, to keep the cam face 15-c away from the cam face 6-b of the barrier opening/closing ring 6, in the telephoto state in which the spacing distance between lens groups becomes short within the range of photo-taking positions, as shown in FIG. 2(c). (ii) For a movement from the wide-angle state to the barrel-retracted state, the rotary cam plate 15 is turned to the left to have the cam face 15-c in contact with the cam face 6-b, as shown in FIGS. 2(b) and 2(a).

With the mechanism arranged in the above-stated manner, when the zoom lens barrel is in the telephoto and wide-angle states, the cam face 15-c of the rotary cam plate 15 and the cam face 6-b of the barrier opening/closing ring 6 never engage each other even when the barrier opening/closing ring 6 and the rotary cam plate 15 approach each other as the first and second lens groups 1 and 8 approach each other in the telephoto state as indicated by a distance F in FIG. 1(c). Under this condition, the barrier opening/closing ring 6 is constantly urged by the tension spring 14 to move in the direction of opening the lens barrier (rotation to the right). In shifting the zoom lens barrel to the barrier-retracted state in which the distance between the lens groups is about equal to the distance obtained in the telephoto state, the barrier opening/closing ring 6 is caused to rotate to the left against the urging force of the tension spring 14 by utilizing a force of bringing the rotary cam plate 15 and the barrier opening/closing ring 6 closer to each other, i.e., a force of contracting a distance G to a distance H shown in FIGS. 1(a) and 1(b). The barrier members 7-a and 7-b thus can be closed.

Figure 3A:
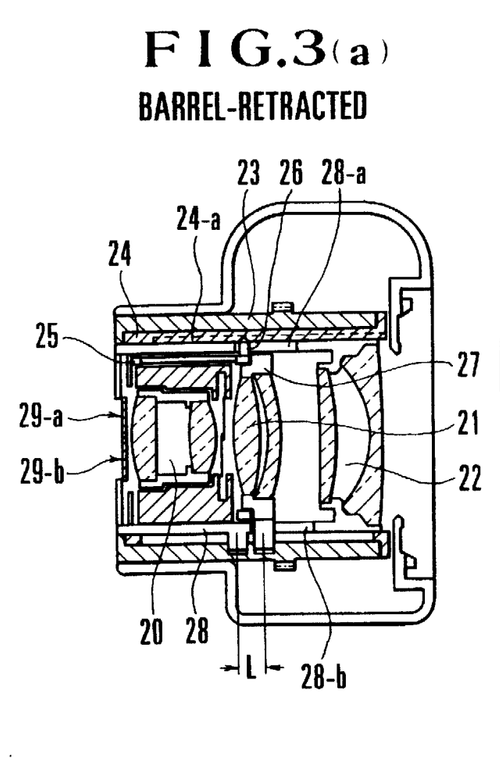
FIG. 3 is a center sectional view showing the arrangement of a second embodiment of the invention.
Figure 3B:
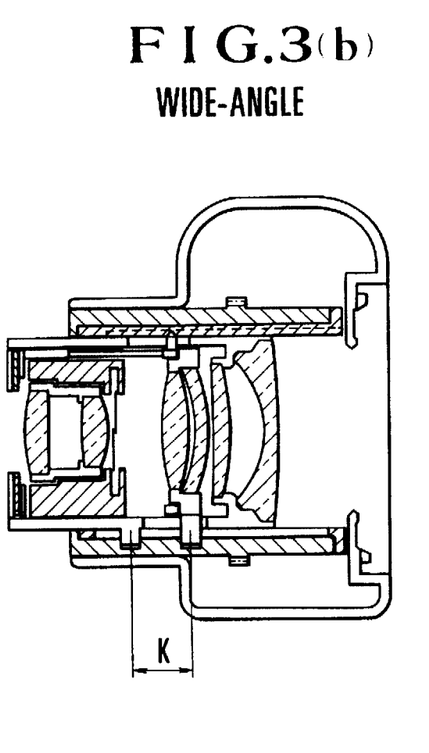
Figure 3C:
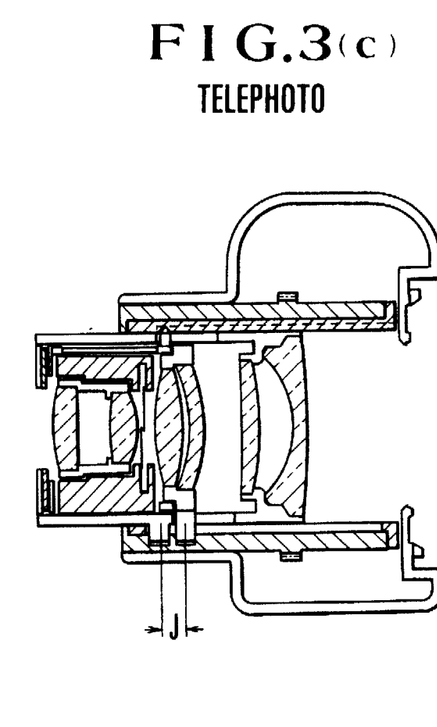

FIGS. 3(a) to 3(c) are sectional views of a second embodiment of this invention.

In the case of the second embodiment, the invention is applied to a zoom lens consisting of three lens groups 20, 21 and 22. The first and third lens groups 20 and 22 are arranged to move together to shift the zoom lens to and from a telephoto state and a wide-angle state, while the second lens group 21 which is located between them is arranged to vary the focal length of the zoom lens by moving relative to the first and third lens groups 20 and 22. A cam tube 23, a linear-motion tube 24 and a cam groove 24-a formed in the inner wall of the linear-motion tube 24 are arranged and act in the same manner as those of the first embodiment. A lens barrel 28 which carries both the first lens group 20 and the third lens group 22 is provided with a pin on its side face for a rotary cam plate 26 and also with slots 28-a and 28-b for escaping the cam pins of a holding frame 27 for the second lens group 21. A barrier opening/closing ring 25 is rotatably arranged within the lens barrel 28. The rotary cam plate 26 is rotatably carried by the second-lens-group holding frame 27. A moving mechanism for the lens groups 20, 21 and 22 is arranged in the same manner as in the case of the first embodiment.

With the zoom lens barrel arranged as described above, a distance between the first lens group 20 and the second lens group 21 is at a value J in the telephoto state and at a value K in the wide-angle state. Barrier members 29-a and 29-b are never closed while the position of the zoom lens barrel is shifting within the range between the distances J and K. When the distance K is contracted to a distance L by an action of shifting the zoom lens barrel from the wide-angle state to the barrel-retracted state, the distance contracting force of this action causes the barrier members 29-a and 29-b to be closed.

In other words, in accordance with the invention, even in the case of a zoom lens barrel, like in the case of the second embodiment, where the first and third lens groups 20 and 22 are carried together by the lens barrel 28 to have no change caused by the lens barrel retracting action in the spacing distance as a whole, a lens barrier opening/closing force can be obtained by utilizing the change in spacing distance between lens groups other than between the first and third lens groups.

Figure 4A:
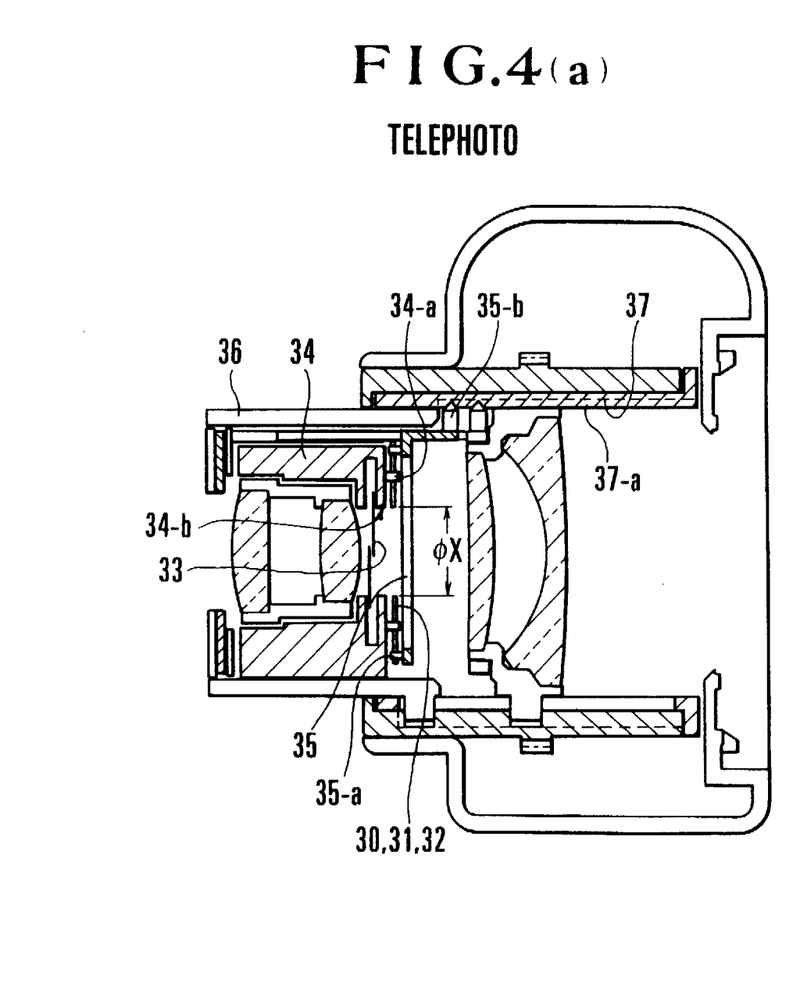
FIGS. 4(a) and 4(b) are center sectional views showing a third embodiment of the invention.
Figure 4B:
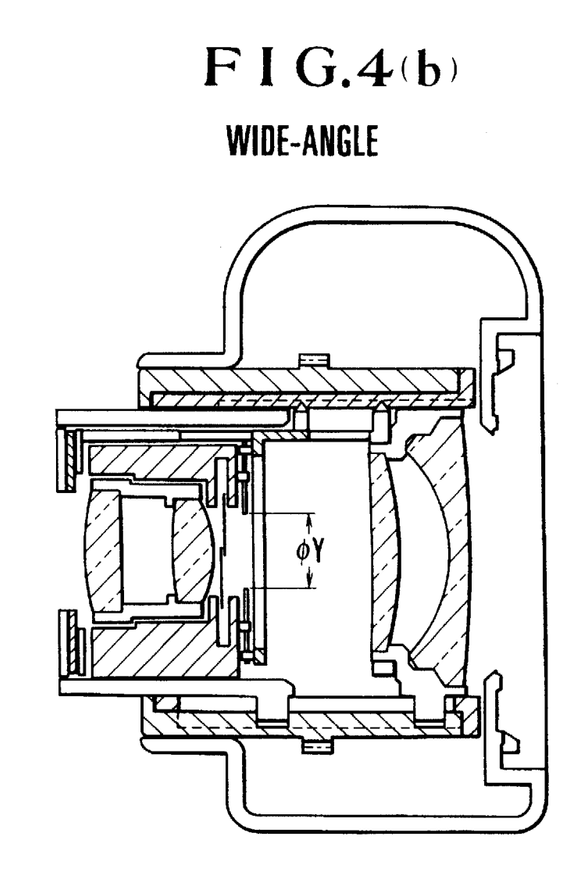
Figure 5A:
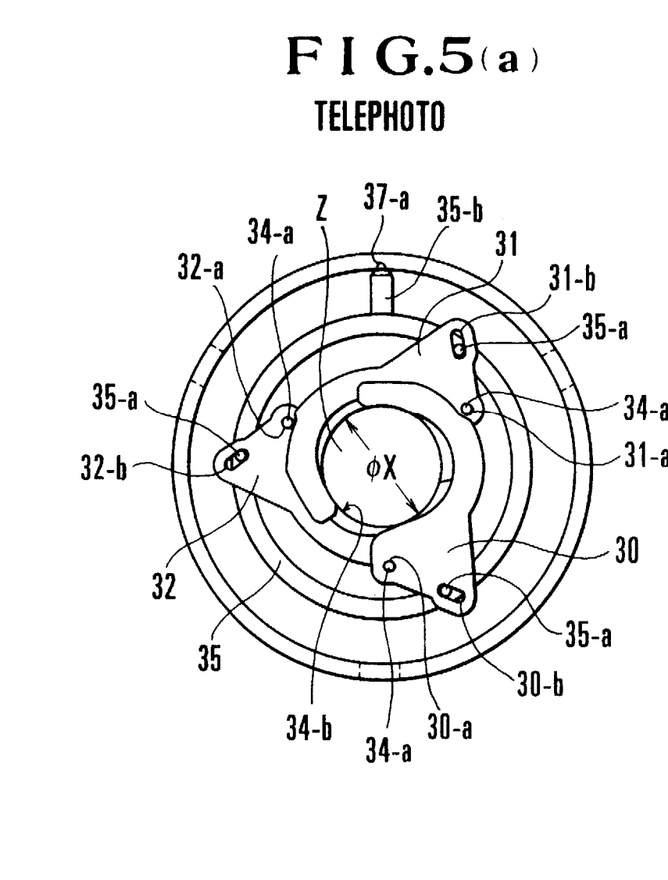
FIGS. 5(a) and 5(b) are front views showing the third embodiment of the invention.
Figure 5B:
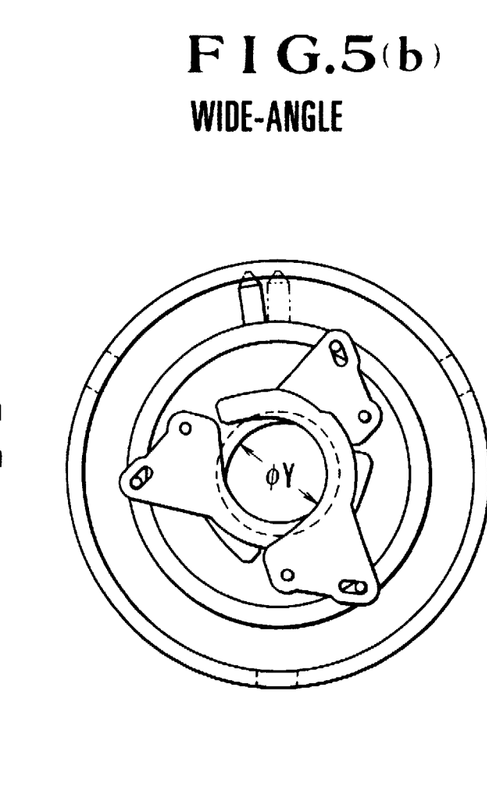

A third embodiment of the invention is arranged as shown in FIGS. 4(a), 4(b), 5(a) and 5(b). FIGS. 5(a) and 5(b) are front views and FIGS. 4(a) and 4(b) are center sectional views. The zooming action and the barrel retracting action of the third embodiment are the same as those of the first embodiment and are, therefore, omitted from the following description.

Diaphragm varying blades 30, 31 and 32 are arranged and act in about the same manner as those of ordinary shutter blades. A shutter base member 34 is arranged to drive shutter blades 33 and is provided with an aperture 34-b for allowing a bundle of rays to pass therethrough. Shafts 34-a are planted on the shutter base member 34 around the aperture 34-b. The shafts 34-a are rotatably fitted into holes 30-a, 31-a and 32-a which are provided in the diaphragm varying blades 30, 31 and 32. A diaphragm ring 35 is disposed on one side of the shutter base member 34 across the diaphragm varying blades 30, 31 and 32. Shafts 35-a are planted on the diaphragm ring 35 and are slidably fitted in sector holes 30-a, 31-a and 32-a formed in the diaphragm varying blades 30, 31 and 32. The diaphragm ring 35 itself is rotatably held within a lens barrel 36 and is arranged to move in the direction of an optical axis together with the lens barrel 36 when the zoom lens barrel is shifted to or from a telephoto state, a wide-angle state or a barrel-retracted state.

With the third embodiment arranged in the above-stated manner, when the diaphragm ring 35 rotates within the lens barrel 36, an aperture Z which is formed with the diaphragm varying blades 30, 31 and 32 overlapping each other is varied by the rotation. The aperture Z is at a diameter X which is about the same as the aperture 34-b of the shutter base member 34 in a state shown in FIG. 5(a). The aperture Z can be reduced by the rotation to a diameter Y in a shape which is approximately circular as shown in FIG. 5(b).

The diaphragm ring 35 is caused to rotate by a combination of a pin 35-b planted on the side face of the diaphragm ring 35 and a cam groove 37-a formed in a linear-motion tube 37 to allow the pin 35-b to be slidably fitted in the cam groove 37-a. The details of the motion of the diaphragm ring 35 are similar to that of the rotary cam plate 15 of the first embodiment shown in FIG. 2(c). In the case of the third embodiment, the diaphragm ring 35 is arranged to rotate accordingly as the lens barrel 36 moves in the direction of the optical axis within the linear-motion tube 37 as shown in FIGS. 4(a) and 4(b). By this arrangement, the diameter of the aperture in the neighborhood of the shutter blades 36 is caused to vary in association with a zooming action.

Further, the aperture diameter can be changed also in the following manner.

The shutter blades have heretofore been arranged to have fitting engagement holes and sector holes (slots). The shutter blades are caused to swing on the fitting engagement holes by driving sector pins which are slidably fitted in the sector holes. An optical path is opened and closed by the swinging motion of the shutter blades on the fitting engagement holes. At that time, since fitting engagement shafts planted on a shutter base member are fitted into the fitting engagement holes, the shutter blades make no movement other than swinging.

Therefore, with the fitting engagement shafts replaced with the shafts 35-a shown in FIG. 4(a), the position of the fitting engagement shafts can be shifted in association with the zooming action. Even if the sector pins move in the same manner, the aperture defining loci of the shutter blades thus can be changed in association with the zooming action.

In opening and closing the lens barrier by utilizing changes taking place in spacing distance between lens groups, each of the embodiments described above is arranged as follows. A zoom lens barrel is provided with a driving member, such as the rotary cam plate, which is arranged to have no cam engagement when the zoom lens is in a photo-taking state and to have cam engagement only for a process of retracting the zoom lens barrel into the barrel-retracted state. Unlike the conventional camera, the invented arrangement obviates the necessity of use of such a cam plate that is fixed to an aperture and is free from any restriction imposed by the diameter of the zoom lens barrel.

It is another advantage of the invention that a lens group moving stroke necessary in taking a picture and a lens group moving stroke necessary in moving the lens barrel into the barrel-retracted state never impose any restrictions on each other.

It is a further advantage of the invention that the lens barrier driving mechanism can be driven solely by a force obtainable from the internal arrangement of the lens barrel, such as the cam plate, instead of by a driving force obtained from some part disposed outside of the zoom lens barrel.

Further, the use of a rotary member, such as the rotary cam plate, that rotates in association with a zoom driving action permits a maximum aperture diameter to be varied to any desired aperture diameter according to zooming, without depending on the full opening diameter of the ordinary shutter blades. Therefore, the diaphragm aperture can be changed to efficiently cut an unnecessary peripheral part of a light flux as desired for each focal length of the zoom lens. Further, according to the invented arrangement, various mechanisms other than the diaphragm blades also can be driven in association with a zooming action.

What is claimed is:

1. An optical apparatus comprising:
   a lens barrier which is movably supported;
   a lens arranged to be movable in the direction of an optical axis; and
   a lens barrier moving mechanism for moving said lens barrier in a first direction as from a closed state to an open state and a second direction as from said open state to said closed state, said lens barrier moving mechanism including a moving member arranged to move in the direction of the optical axis and around the optical axis in association with a movement of said lens, and said lens barrier being arranged to be moved in the first direction and the second direction by a movement of said moving member based on the movement of said lens in the direction of the optical axis, said lens barrier having been moved in said first direction to an open state and said moving member moving around the optical axis on the basis of the movement of said lens forward in the optical axis direction, from said open state of said lens barrier to maintain said open state of said lens barrier.

2. An optical apparatus according to claim 1, wherein said lens barrier is arranged to move in the direction of the optical axis in association with the movement of said lens.

3. An optical apparatus according to claim 1, wherein said lens barrier is arranged to be moved from the open state to the closed state by a movement of said moving member based on the movement of said lens rearward along the optical axis.

4. An optical apparatus according to claim 3, wherein said lens barrier is urged by a spring to move toward the open state.

5. An optical apparatus according to claim 4, wherein said lens barrier is open when said moving member is in a position where said moving member is not in contact with said lens barrier, and is closed when said moving member is in a position where said moving member is in contact with said lens barrier.

9

6. An optical apparatus according to claim 3, wherein said lens includes at least two lens groups, and wherein said lens barrier is moved from the open state to the closed state by a movement of said moving member based on movements of said two lens groups rearward along the optical axis.

7. An optical apparatus according to claim 6, wherein said two lens groups are arranged to vary the focal length of said lens by moving.

8. An optical apparatus according to claim 7, wherein said moving member is arranged to close said lens barrier when a spacing distance between said two lens groups becomes short.

9. An optical apparatus according to claim 1, wherein said lens barrier is swingably supported by a rotary member and is arranged to be opened by the rotation in one direction of said rotary member and to be closed by the rotation in the other direction of said rotary member, and wherein said rotary member is arranged to be rotated by a movement of said moving member.

10. An optical apparatus according to claim 1, wherein said optical apparatus is a lens barrel.

11. An optical apparatus according to claim 1, wherein said optical apparatus is a camera having a lens barrel.

12. An optical apparatus comprising:
    a barrier mechanism including a lens barrier which is movably supported;
    a lens arranged to be movable in the direction of an optical axis; and
    a lens barrier moving mechanism for moving said lens barrier in a first direction as from a closed state to an open state and a second direction as from said open state to said closed state, said lens barrier moving mechanism including a moving member arranged to move at least around the optical axis in association with a movement of said lens, and an abutting part of said barrier mechanism causing said lens barrier to be moved in the first direction or the second direction by abutting on said moving member according to a movement of said moving member based on the movement of said lens in the direction of the optical axis, said lens barrier having been moved in said first direction to an open state and said moving member moving around the optical axis on the basis of the movement of said lens forward in the optical axis direction, from said open state of said lens barrier to maintain said open state of said lens barrier.

13. An optical apparatus according to claim 12, wherein said lens barrier is arranged to move in the direction of the optical axis in association with the movement of said lens.

14. An optical apparatus according to claim 12, wherein said lens barrier is arranged to be moved from the open state to the closed state by a movement of said moving member based on the movement of said lens rearward along the optical axis.

15. An optical apparatus according to claim 14, wherein said lens barrier is urged by a spring to move toward the open state.

16. An optical apparatus according to claim 14, wherein said lens includes at least two lens groups, and wherein said lens barrier is moved from the open state to the closed state by a movement of said moving member based on movements of said two lens groups rearward along the optical axis.

10

17. An optical apparatus according to claim 16, wherein said two lens groups are arranged to vary the focal length of said lens by moving.

18. An optical apparatus according to claim 17, wherein said moving member is arranged to close said lens barrier when a spacing distance between said two lens groups becomes short.

19. An optical apparatus according to claim 12, wherein said barrier mechanism is arranged to swingably support said lens barrier and includes a rotary member, wherein said lens barrier is arranged to be opened by the rotation of said rotary member in one direction and to be closed by the rotation of said rotary member in the other direction, and wherein said moving member is arranged to cause said rotary member to rotate by moving to abut on an abutting part of said rotary member.

20. An optical apparatus according to claim 19, wherein said lens barrier is open when said moving member is in a position where said moving member is not in contact with the abutting part of said rotary member, and is closed when said moving member is in a position where said moving member is in contact with the abutting part of said rotary member.

21. An optical apparatus according to claim 12, wherein said optical apparatus is a lens barrel.

22. An optical apparatus according to claim 12, wherein said optical apparatus is a camera having a lens barrel.

23. An optical apparatus comprising:
    a barrier mechanism including a lens barrier which is movably supported;
    a first lens group and a second lens group arranged to be movable in the direction of an optical axis; and
    a barrier moving mechanism for moving said lens barrier in a first direction as from a closed state to an open state and a second direction as from said open state to said closed state, said barrier moving mechanism including a moving member arranged to move at least around the optical axis in association with variations of a spacing distance between said first and second lens groups, and an abutting part of said barrier mechanism causing said lens barrier to be moved in the first direction or the second direction by abutting on said moving member according to a movement of said moving member based on the movement of said first and second lens groups in the direction of the optical axis, said lens barrier having been moved in said first direction to an open state and said moving member moving around the optical axis on the basis of the movement of a lens group forward in the optical axis direction, from said open state of said lens barrier to maintain said open state of said lens barrier.

24. An optical apparatus according to claim 23, wherein said lens barrier is arranged to move in the direction of the optical axis in association with the movement of said first and second lens groups.

25. An optical apparatus according to claim 23, wherein said lens barrier is arranged to move from the open state to the closed state by a movement of said moving member based on a spacing distance between said first and second lens groups becoming short.

26. An optical apparatus according to claim 25, wherein said lens barrier is urged by a spring to move toward the open state.

27. An optical apparatus according to claim 23, wherein said lens barrier mechanism is arranged to swingably support said barrier and includes a rotary member, wherein said lens barrier is arranged to be opened by the rotation of said rotary member in one direction and to be closed by the rotation of said rotary member in the other direction, and wherein said moving member is arranged to cause said rotary member to rotate by moving to abut on an abutting part of said rotary member.

28. An optical apparatus according to claim 27, wherein said lens barrier is open when said moving member is in a position where said moving member is not in contact with the abutting part of said rotary member, and is closed when said moving member is in a position where said moving member is in contact with the abutting part of said rotary member.

29. An optical apparatus according to claim 27, wherein said second lens group is arranged to vary a focal length by moving.

30. An optical apparatus according to claim 23, wherein said optical apparatus is a lens barrel.

31. An optical apparatus according to claim 23, wherein said optical apparatus is a camera having a lens barrel.

* * * * *

UNITED STATES PATENT AND TRADEMARK OFFICE
CERTIFICATE OF CORRECTION

PATENT NO. : 5,761,556

DATED : June 2, 1998

INVENTOR(S) : Kazushige Ichino

It is certified that error appears in the above-identified patent and that said Letters Patent is hereby corrected as shown below:

Col. 1, line 4, delete "Nov. 28/1994" and insert -- Nov. 28, 1994 --.

Col. 6, line 14, delete "barrier" and insert -- barrel --.

Col. 10, line 67, delete "lens".

Signed and Sealed this

Twenty-ninth Day of December, 1998

Attest:

BRUCE LEHMAN

*Attesting Officer*   *Commissioner of Patents and Trademarks*